(12) United States Patent
Cominsky (10) Patent No.: US 12,286,998 B1
(45) Date of Patent: Apr. 29, 2025

(54) SERRATED FITTING (71) Applicant: The Boeing Company, Arlington, VA (US)

(72) Inventor: Kenneth D. Cominsky, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/482,451

(22) Filed: Oct. 6, 2023

(51) Int. Cl.
| | |
|---|---|
| *F16B 5/02* | (2006.01) |
| *B64C 1/18* | (2006.01) |
| *B64D 9/00* | (2006.01) |
| *B64F 5/10* | (2017.01) |

(52) U.S. Cl.
CPC .............. *F16B 5/02* (2013.01); *B64D 9/00* (2013.01); *B64F 5/10* (2017.01); *B64C 1/18* (2013.01); *B64D 2009/006* (2013.01)

(58) Field of Classification Search
CPC ....... B64F 5/10; B64D 9/00; B64D 2009/006; B64C 1/18
See application file for complete search history.

(56) References Cited

U.S. PATENT DOCUMENTS

| | | | |
|---|---|---|---|
| 9,302,760 B2 | 4/2016 | Kharitonov et al. | |
| 2008/0302060 A1* | 12/2008 | Ciprian | B64C 1/06 52/787.12 |
| 2008/0302909 A1 | 12/2008 | Chrissos et al. | |
| 2014/0064827 A1* | 3/2014 | Korenromp | B64D 11/00 403/63 |
| 2020/0398973 A1* | 12/2020 | Bacon | B64F 5/10 |
| 2021/0269241 A1* | 9/2021 | Shivalinga | B65G 1/0492 |
| 2022/0074446 A1* | 3/2022 | Tanaka | B64C 1/069 |

OTHER PUBLICATIONS

Extended European Search Report, dated Feb. 7, 2025, regarding EP Application No. 24201882.8, 8 pages.

\* cited by examiner

*Primary Examiner* — Rodney A Bonnette
(74) *Attorney, Agent, or Firm* — Yee & Associates, P.C.

(57) ABSTRACT

A serrated fitting and method for installing fixed length roller tray segments spanning an aircraft fuselage integration zone. The serrated fitting includes a first surface for attachment to a fixed length roller tray segment. The serrated fitting also includes a serrated surface for engagement with a serrated plate attached to a floor beam of an aircraft. A fastener connects the serrated surface to the serrated plate and the floor beam through a pre-drilled hole in the floor beam. The pre-drilled hole is larger than the diameter of the fastener to accommodate accumulated tolerance between joined fuselage sections at a fuselage integration zone.

20 Claims, 10 Drawing Sheets

SERRATED FITTING

BACKGROUND INFORMATION

1. Field

The present disclosure relates generally to serrated fittings. More specifically, the present disclosure relates to a no-drill solution to support installation of fixed length roller tray segment of a cargo handling system spanning a fuselage integration zone with large manufacturing tolerances.

2. Background

Freighter aircraft often incorporate continuous roller trays for cargo handling. The roller trays consist of multiple segments, where each segment is of a fixed length. In some instances, a roller tray segment may span fuselage locations where there is a circumferential joint. The circumferential joint may also be referred to as an integration zone. The integration zone is where two adjacent fuselage sections are joined. At these locations, assembly tolerances accumulate.

Installation of continuous roller tray cargo handling systems utilize discrete roller tray attach fittings at each end or along the length of the fixed length roller tray segments fastened to pre-installed floor beams. In a fuselage integration zone, the exact distance between floor beams is unknown due to assembly tolerance accumulation between sections of the fuselage.

To allow for these assembly tolerances, existing solutions delay installation (i.e. drilling and filling) of the roller tray attach fittings to the floor beams until after the circumferential joint is installed on the airplane at final assembly. Aircraft manufacturers drill holes into the aircraft substructure, such as floor beams, in final assembly after the circumferential joints of the fuselage have been assembled in order to attach the fixed length roller tray segments. This post-final assembly drilling in floor beams is a significant foreign object debris (FOD) and cost issue if any systems such as electrical, fuel, or environmental control (ECS) have been previously installed in the fuselage below the drill locations.

Therefore, it would be desirable to have a method and apparatus that takes into account at least some of the issues discussed above, as well as other possible issues.

SUMMARY

An illustrative embodiment of the present disclosure provides a serrated fitting for installation of a fixed length roller tray segment of an aircraft. The serrated fitting comprises a first surface and a serrated surface opposite the first surface. The first surface is connected to a fixed length roller tray segment. The serrated surface is for engagement with a serrated plate attached to a floor beam pre-installed in the aircraft. A fastener connects the serrated surface to the serrated plate and the floor beam through a pre-drilled hole in the floor beam. The pre-drilled hole has a dimension that is axially aligned with a longitudinal axis of the fixed length roller tray segment. The dimension is greater than a diameter of the fastener.

Another illustrative embodiment of the present disclosure provides a fixed length roller tray installation system comprising a fixed length roller tray segment of an aircraft, a serrated fitting, a serrated plate, and a fastener. The serrated fitting is connected to the fixed length roller tray segment. The serrated plate is connected to a floor beam of the aircraft. A serrated surface of the serrated fitting is engaged with the serrated plate. The fastener connects the serrated surface of the serrated fitting to the serrated plate and to the floor beam of the aircraft through a pre-drilled hole in the floor beam.

A further illustrative embodiment of the present disclosure provides a method for installing fixed length roller tray segments spanning an aircraft fuselage integration zone. A first set of floor beams are installed in a first aircraft fuselage section. A second set of floor beams are installed in a second aircraft fuselage section, wherein at least one of the first set of floor beams or the second set of floor beams comprises a pre-drilled hole. The first aircraft fuselage section is joined to the second aircraft fuselage section at a fuselage integration zone. A serrated fitting is connected to a fixed length roller tray segment. A serrated plate is connected to the first set of floor beams or the second set of floor beams having the pre-drilled hole. The serrated plate surrounds the pre-drilled hole. A serrated surface of the serrated fitting engages the serrated plate. The serrated fitting is fastened to the first set of floor beams or the second set of floor beams with a fastener through the pre-drilled hole. The pre-drilled hole has a dimension axially aligned with a longitudinal axis of the fixed length roller tray segment and the dimension is greater than a diameter of the fastener.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that installation of continuous roller tray cargo handling systems utilize discrete fixed length roller tray segments.

The illustrative embodiments also recognize and take into account that the installation of the fixed length roller tray segments may span a circumferential joint or integration zone of two joined fuselage sections. Due to manufacturing variances, the spacing between floor beams of the two joined fuselage sections may not be consistent and varies within accepted tolerances.

The illustrative embodiments also recognize and take into account that because the exact distance between floor beams may not be known prior to joining the fuselage sections, existing installation techniques attach fittings to the floor beams after the circumferential joint is installed on the airplane at final assembly requiring aircraft manufacturers to drill holes into the aircraft substructure in final assembly in order to attach the fixed length roller tray segments.

The illustrative embodiments also recognize and take into account that this post-final assembly drilling in floor beams is a significant FOD issue to any systems such as electrical, fuel, or ECS that have been previously installed in the fuselage below the drill locations.

Thus, the illustrative embodiments provide a serrated fitting for installation of fixed length roller tray segments that span a fuselage integration zone at final assembly. The serrated plate engagement and oversized, pre-drilled holes allow for no-drill installation of fixed length roller tray segments and respective serrated fittings in the fuselage circumferential integration zone having floor beam to floor beam distance variation. The load path of the fixed length roller tray segment passes through the serrated fitting and bypasses the fastener used to attach the serrated fitting and ultimately the fixed length roller tray segment to a floor beam of the aircraft while also accounting for accumulated tolerance between joined fuselage sections at the fuselage integration zone.

Figure 1:
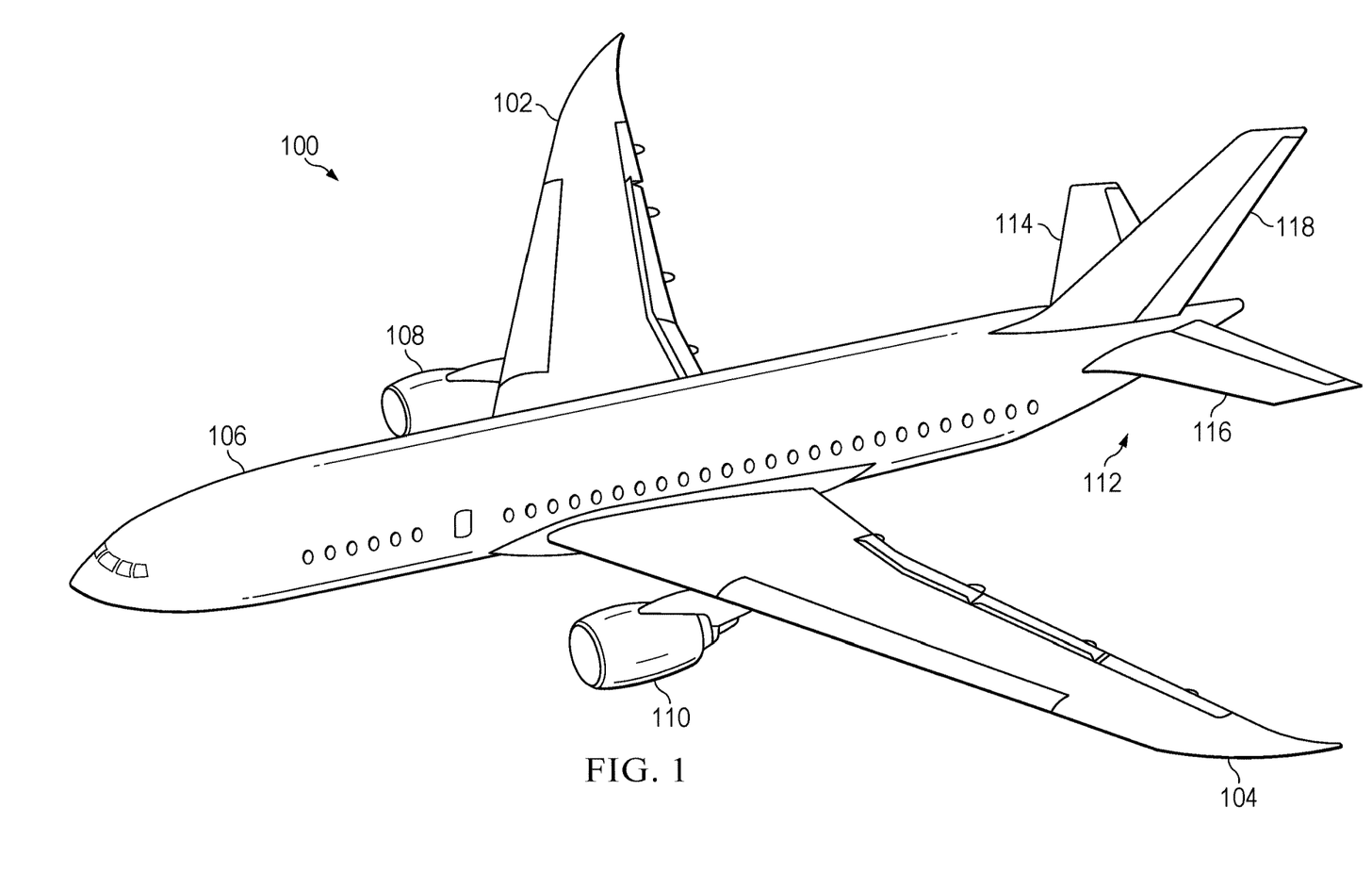
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which fixed length roller trays of a cargo handling system may be installed in accordance with an illustrative example. For example, a cargo area located in fuselage 106 of aircraft 100 may have a cargo handling system attached to floor beams of the aircraft. Fixed length roller tray segments of the cargo handling system can be attached to the floor beams after fuselage sections are joined where a fixed length roller tray segment spans the fuselage integration zone of the joined fuselage sections. A fixed length roller tray installation system comprising a serrated fitting allows the fixed length roller tray to be attached to the in-place floor beams and account for tolerances between the joined fuselage sections.

The illustration of aircraft 100 in FIG. 1 is not meant to imply physical or architectural limitations to the manner in which an illustrative example may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative example are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where installation of fixed length roller tray segments is desirable.

Figure 2:
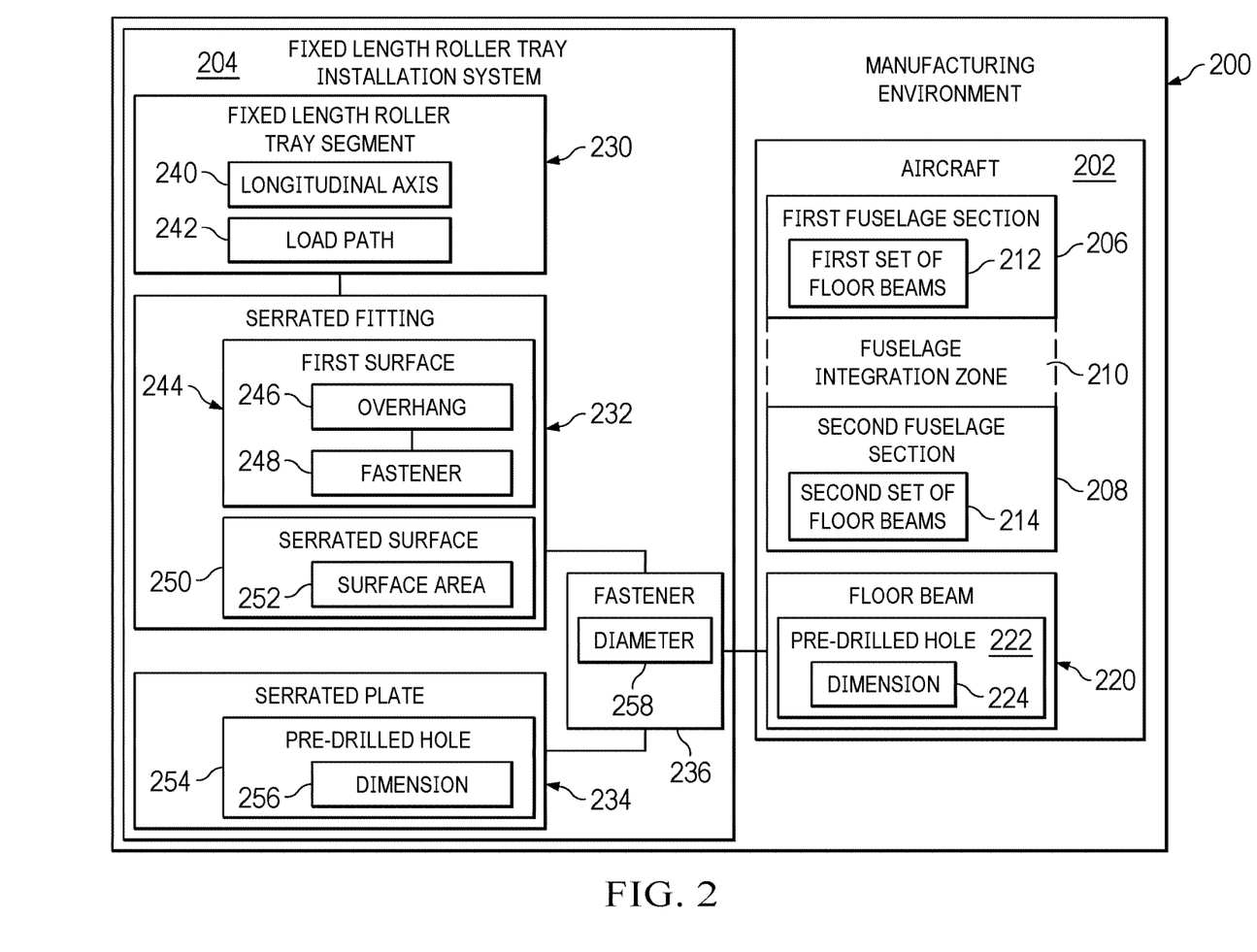
FIG. 2 is an illustration of a block diagram of a manufacturing environment in accordance with an illustrative embodiment.

Turning now to FIG. 2, an illustration of a block diagram of an aircraft manufacturing environment is depicted in accordance with an illustrative example. Aircraft manufacturing environment 200 includes aircraft 202 and fixed length roller tray installation system 204.

In this illustrative example, aircraft 202 includes first fuselage section 206 and second fuselage section 208. First fuselage section 206 is joined to second fuselage section 208 at fuselage integration zone 210. First fuselage section 206 includes first set of floor beams 212 and second fuselage section 208 includes second set of floor beams 214. In this illustrative example, aircraft 202 is at final assembly as first fuselage section 206 is joined to second fuselage section 208. The distance between a floor beam of first set of floor beams 212 and a floor beam of second set of floor beams 214 is unknown prior to final assembly because of allowed tolerances in fuselage integration zone 210. Floor beam 220 represents a floor beam of either first set of floor beams 212 or second set of floor beams 214. Floor beam 220 includes pre-drilled hole 222. Pre-drilled hole 222 is drilled in floor beam 220 prior to final assembly, or prior to first fuselage section 206 is joined to second fuselage second fuselage section 208. Pre-drilling pre-drilled hole 222 prior to joining first fuselage section 206 to second fuselage section 208 prevents foreign object debris, such as drill shavings, from interfering with any systems already installed in the fuselage sections. In other words, there is no drilling of holes in the floor beams after the fuselage sections have been joined together. Pre-drilled hole 222 exists prior to the fuselage sections being joined together at final assembly.

Pre-drilled hole 222 has dimension 224. Dimension 224 is a forward-aft dimension and must be greater than the diameter of a fastener that will be used in pre-drilled hole 222. Pre-drilled hole 222 is typically circular or slot shaped but can be any shape that includes a dimension that is greater than the diameter of the fastener. In other words, dimension 224 of pre-drilled hole 222 must be of sufficient size to account for all applicable manufacturing and assembly tolerances. Dimension 224 is axially aligned or parallel with a longitudinal axis of the soon to be attached fixed length roller tray segment 230. Dimension 224 is axially aligned or parallel with the longitudinal axis of the fuselage sections. Dimension 224 will account for variations in the distance between floor beams that a fixed length floor tray segment is attached to. Dimension 224 will be large enough to accommodate tolerance stack up longitudinally in fuselage integration zone 210 between first fuselage section 206 and second fuselage section 208. Dimension 224 will allow for forward-aft positional adjustment of the fixed length roller tray segment with respect to the floor beams.

As used herein, a "set of," when used with reference to items, means one or more items. For example, a "set of floor beams" is one or more of floor beam 220.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, fixed length roller tray installation system 204 includes fixed length roller tray segment 230, serrated fitting 232, serrated plate 234, and fastener 236.

Fixed length roller tray segment 230 is one segment of a complete cargo handling system installed in the cargo bay of aircraft 202. Fixed length roller tray segment 230 may, but not necessarily, span fuselage integration zone 210. Fixed length roller tray segment 230 has longitudinal axis 240. Longitudinal axis 240 is axially aligned longitudinally with first fuselage section 206 and second fuselage section 208. Although one fixed length roller tray segment 230 is depicted, fixed length roller tray installation system 204 may have more than one fixed length roller tray segment 230 for installation with serrated fitting 232. For example, fixed length roller tray installation system 204 may include any number of fixed length roller tray segments to be installed across a cargo area floor of an aircraft.

Fixed length roller tray segment 230 of a cargo handling system installed in the cargo bay of aircraft 202 has load path 242. Load path 242 is the result of movement of cargo loaded on the cargo handling system during operation of aircraft 202. The forward-aft and/or the side-to-side forces generated by the movement of the cargo are transferred from the fixed length roller tray segments of the cargo handling system to the floor beams of the aircraft via load path 242.

Load path 242 represents the forward-aft and/or the side-to-side loads resulting from cargo movement supported by the cargo handling system. Vertical tension loads, such as when an aircraft goes into a steep decline, are not represented by the illustrated load path 242. Load path 242 begins in fixed length roller tray segment 230. Through the use of serrated fitting 232, load path 242 is directed from fixed length roller tray segment 230, through serrated fitting 232 and serrated plate 234 to a floor beam to which fixed length roller tray segment 230 is attached to, such as floor beam 220. Load path 242 does not pass through fastener 236 used to attached serrated fitting 232, and ultimately fixed length roller tray segment 230, to a floor beam such as floor beam 220.

Serrated fitting 232 includes first surface 244. First surface 244 defines overhang 246. Serrated fitting 232 is connected to fixed length roller tray segment 230 at first surface 244 with fastener 248 cooperating with overhang 246. Fastener 248 may be any type of fastener including, for example, a tension stud. Other structural arrangements are possible without an overhang and tension stud combination as long as first surface 244 includes a surface area whose minimal area is sufficiently sized to carry the anticipated loads coming from the cargo supported by the cargo handling system.

Serrated fitting 232 includes serrated surface 250. Serrated surface 250 is on an opposite side of serrated fitting 232 from first surface 244. Serrated surface 250 has surface area 252. The 2D shape of serrated surface 250 is generally polygonal, however, shapes such as circular or oval would suffice as long as a majority of surface area 252 is available for engagement with serrated plate 234. A majority is defined in the typical sense to mean at least over half of surface area 252, for example at least 51% to 100% of surface area 252, is available for engagement with serrated plate 234. Surface area 252 is designed to meet the load transferring requirements coming from the cargo supported by the cargo handling system.

Serrated plate 234 is connected to floor beam 220. Serrated plate 234 is connected to floor beam 220 prior to final assembly, in other words, serrated plate 234 is pre-attached to floor beam 220 before final assembly. Serrated plate 234 may, for example, be connected to floor beam 220 with fasteners not common to fixed length roller tray segment 230 or serrated plate 234 may be connected to floor beam 220 with adhesive. Serrated plate 234 may be integrally formed with floor beam 220. Serrated plate 234 includes pre-drilled hole 254. Pre-drilled hole 254 has dimension 256. The size and shape of pre-drilled hole 254 and dimension 256 generally match pre-drilled hole 222 and dimension 224 in floor beam 220. Pre-drilled hole 254 is typically circular or slot shaped but can be any shape that includes a dimension that is greater than the diameter of fastener 236. In other words, dimension 256 of pre-drilled hole 254 must be of sufficient size to account for all applicable manufacturing and assembly tolerances. Serrated plate 234 is connected to floor beam 220 where pre-drilled hole 254 is aligned with pre-drilled hole 222.

Fastener 236 connects serrated fitting 232 to serrated plate 234. Fastener 236 has diameter 258. Diameter 258 is visibly less than dimension 256 and dimension 224. Should fastener 236 have a cross-section other than the typical circular, the greatest dimension of the other than circular cross-section must be visibly less than dimension 256 and dimension 224. In other words, there is a clearance fit between fastener 236 and pre-drilled hole 222 and pre-drilled hole 254 in the direction of dimension 224 and dimension 256, respectively, that allows fastener 236 to be inserted into pre-drilled hole 222 and pre-drilled hole 254 without interference from floor beam 220 and serrated plate 234.

Serrations of serrated surface 250 of serrated fitting 232 engage serrations of serrated plate 234. The engagement of the serrations prevents forward-aft movement in the direction of dimension 256 or dimension 224 of serrated fitting 232 relative to serrated plate 234. The engagement of the serrations also helps prevent side-to-side movement of serrated fitting 232 relative to serrated plate 234. The placement of serrated fitting 232 relative to serrated plate 234 is adjustable because diameter 258 is less than dimension 256 and dimension 224. The adjustable placement of serrated fitting 232 relative to serrated plate 234 through the length of dimension 256 and dimension 224 is how the illustrative example of fixed length roller tray installation system 204 accommodates manufacturing variances resulting from the spacing between floor beams of the two joined fuselage sections which may not be consistent.

Figure 3:
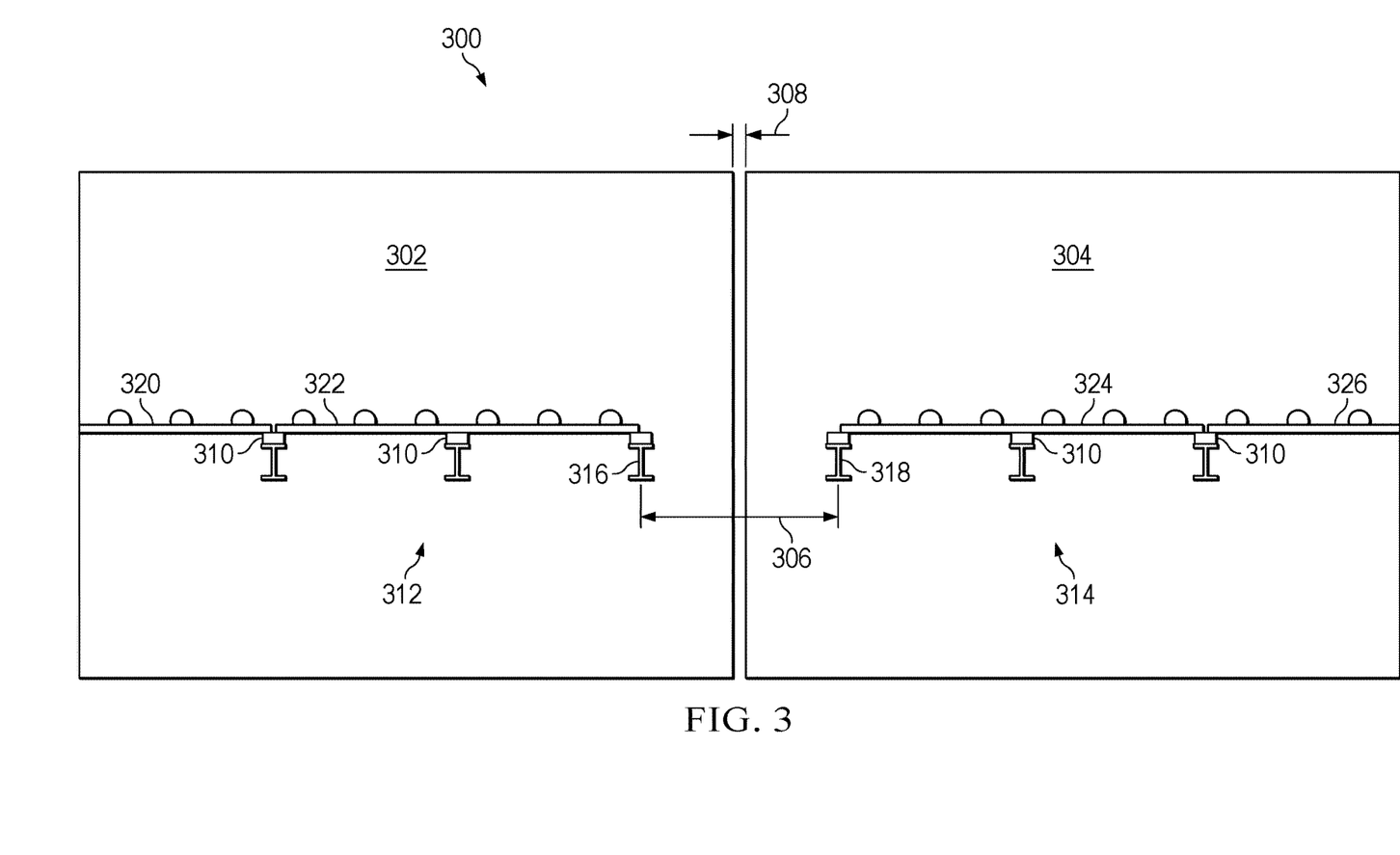
FIG. 3 is an illustration of a cargo handling system in accordance with an illustrative embodiment.
Figure 4:
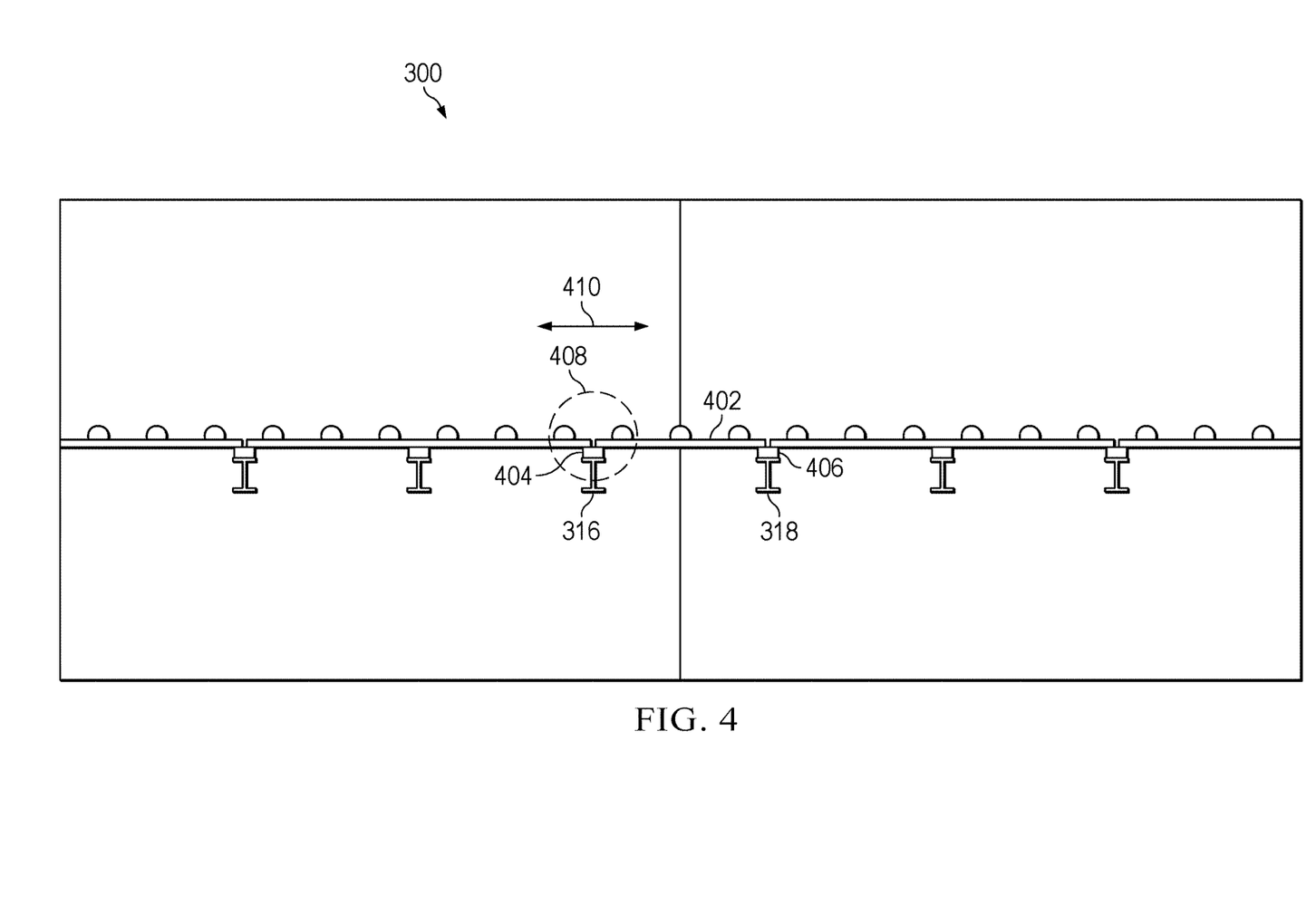
FIG. 4 is an illustration of a cargo handling system in accordance with an illustrative embodiment.

With reference next to FIGS. 3-4, illustrations of a cargo handling system are depicted in accordance with an illustrative embodiment. In this illustrative example and the illustrative examples that follow, the same reference numeral may be used in more than one figure. This reuse of a reference numeral in different figures represents the same element in the different figures. The components illustrated in FIGS. 3-4 are examples of physical implementations of first fuselage section 206, second fuselage section 208, fuselage integration zone 210, first set of floor beams 212, second set of floor beams 214, and floor beam 220 shown in block form in FIG. 2.

As illustrated, cargo handling system 300 includes fixed length roller tray segments 320, 322 mounted to first set of floor beams 312 in first fuselage section 302 and fixed length roller tray segments 324, 326 mounted to second set of floor beams 314 in second fuselage section 304. Serrated fittings 310, or standard fittings, are positioned between each fixed length roller tray segment and a corresponding floor beam. Standard fittings, in other words, fittings not the subject of this disclosure, may be substituted for serrated fitting 310 in this illustrated example because fixed length roller tray segments 320, 322, 324, 326 do not span a fuselage integration zone. However, serrated fitting 310 would be operable in this situation as well. Serrated fitting 310 can be used at each end or along the length of any fixed length roller tray segment, in other words, serrated fitting 310 can be used at any floor beam location where there is tolerance accumulation.

First fuselage section 302 is ready to be joined to second fuselage section 304 at final assembly. First set of floor beams 312 are pre-installed in first fuselage section 302 before final assembly. Second set of floor beams 314 are pre-installed in second fuselage section 304 before final assembly. Distance 306 between floor beam 316 of first fuselage section 302 and floor beam 318 of second fuselage section 304 is unknown until after final assembly because of accepted manufacturing tolerance 308.

Once first fuselage section 302 is joined to second fuselage section 304, as depicted in FIG. 4, fixed length roller tray segment 402 is connected to and between floor beam 316 and floor beam 318. Serrated fittings 404 and 406 connect fixed length roller tray segment 402 to floor beam 316 and floor beam 318, respectively. Serrated fittings 404 and 406 are located to pre-drilled holes in floor beams 316, 318. The length of the dimension of the pre-drilled holes in the longitudinal direction 410 allow lateral movement the fittings relative to the floor beams to accommodate manufacturing tolerance 308 at final assembly. In a minimal implementation scenario, only one serrated fitting is needed, serrated fitting 404 or serrated fitting 406. Factors considered to determine if one or two serrated fittings are used include excessive integration tolerances accounted for by having adjustability at both ends of fixed length roller tray 402, commonality for maintenance, assembly cost, etc.

Figure 5:
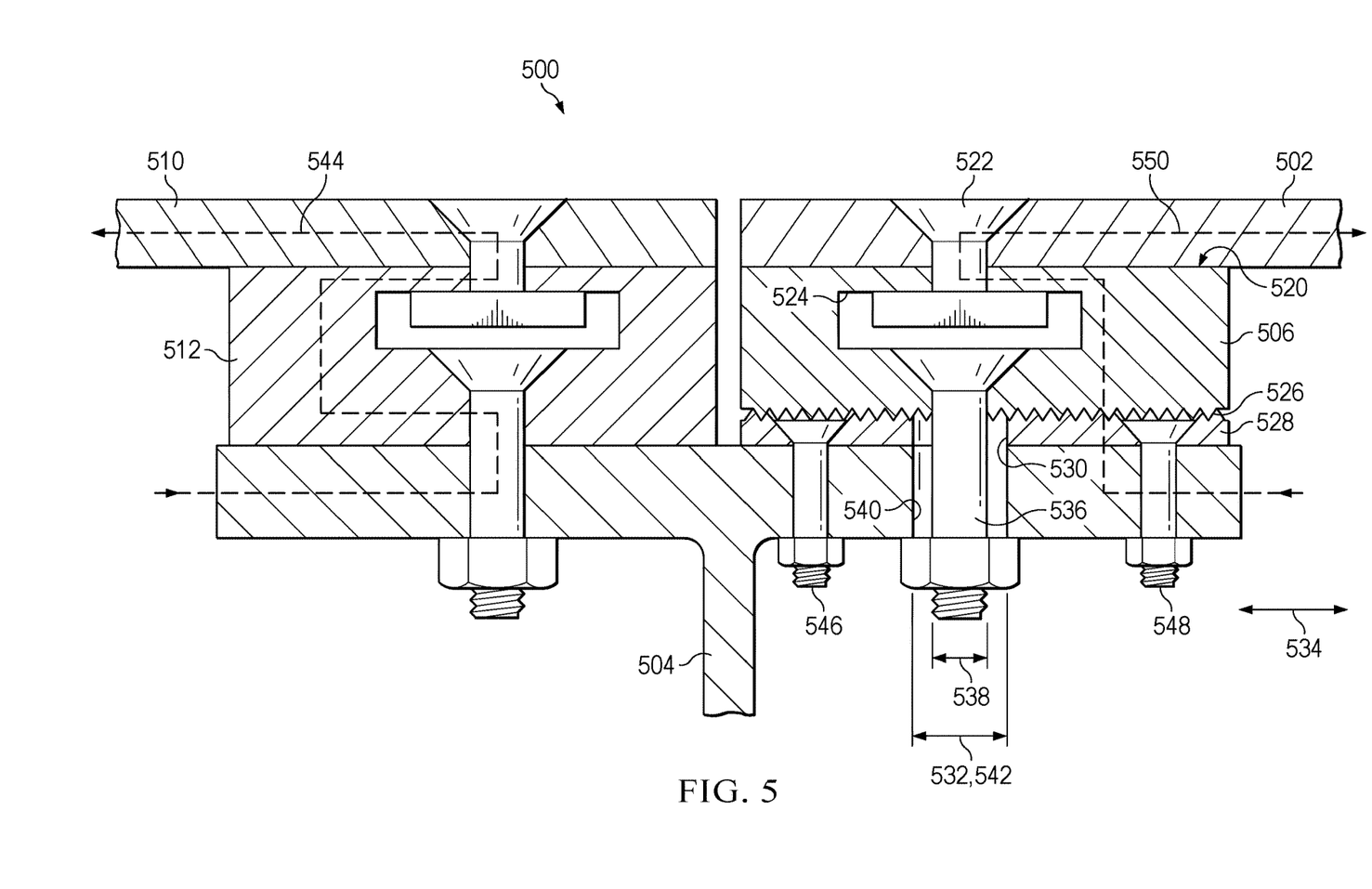
FIG. 5 is an illustration of a fixed length roller tray installation system in accordance with an illustrative embodiment.
Figure 6:
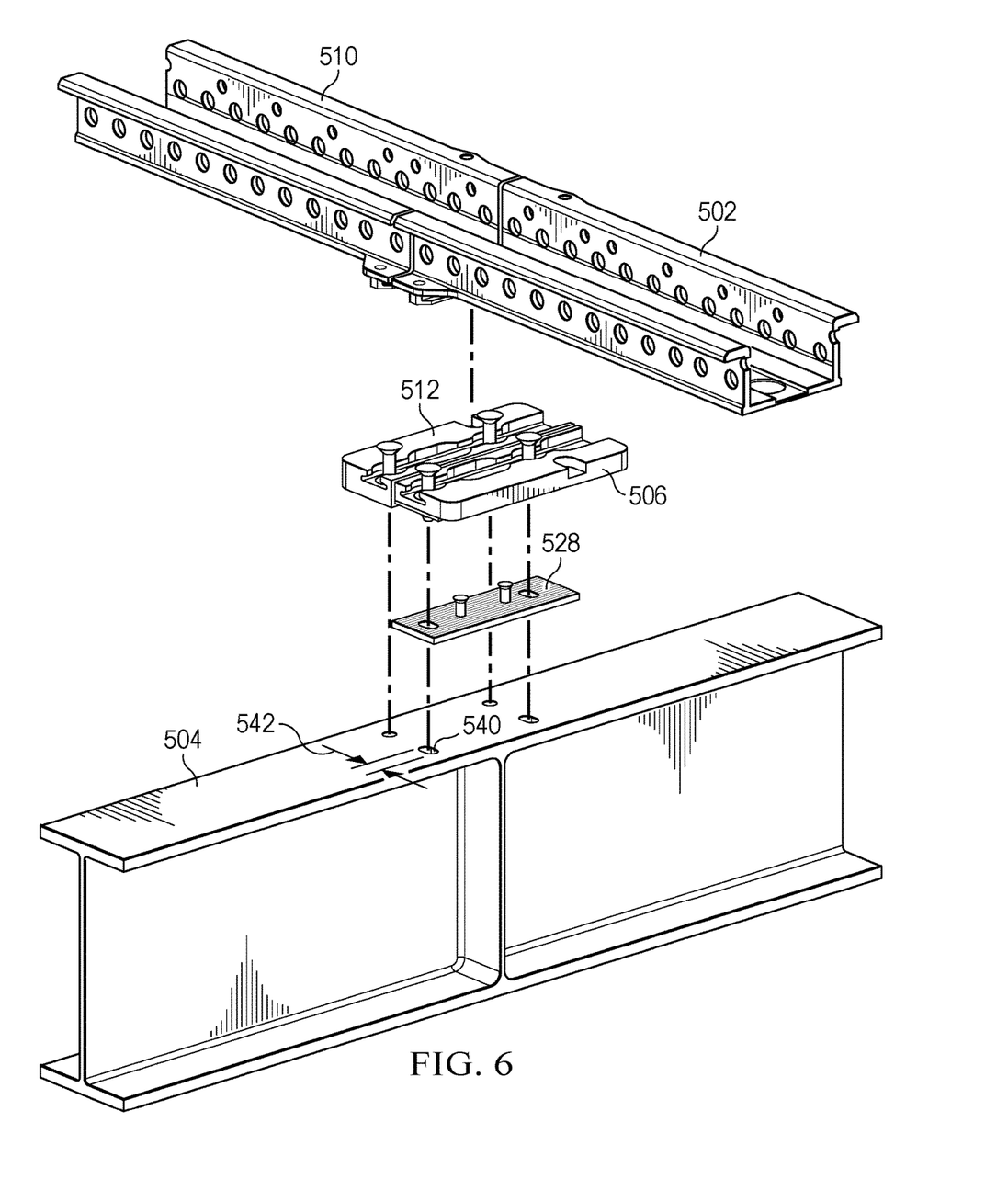
FIG. 6 is an illustration an exploded view of a fixed length roller tray installation system in accordance with an illustrative embodiment.
Figure 7:
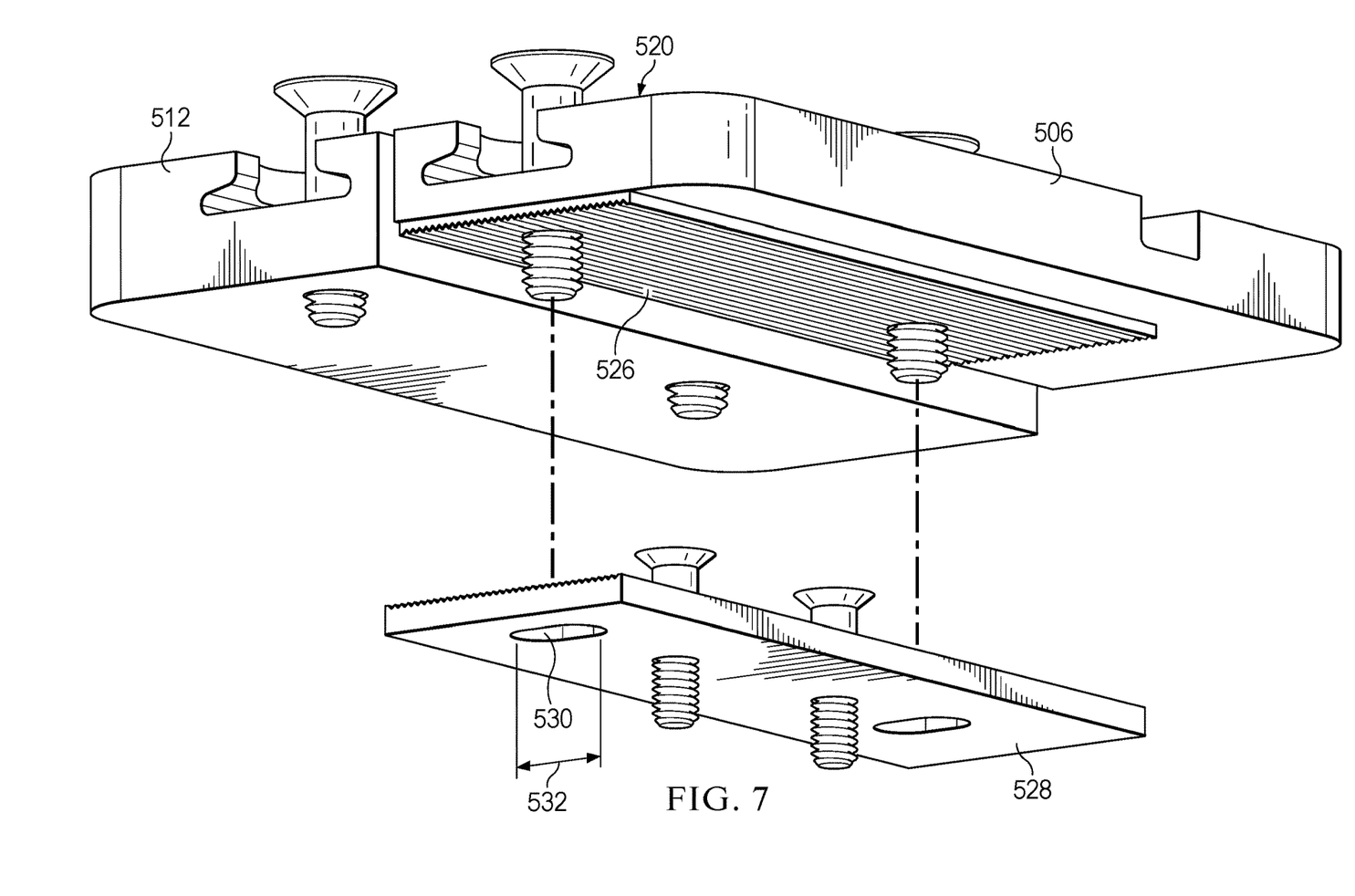
FIG. 7 is an illustration of an isometric view of a serrated fitting and serrated plate in accordance with an illustrative embodiment.

With reference next to FIGS. 5-7, illustrations of a fixed length roller tray installation system 500 is depicted in accordance with an illustrative embodiment.

FIG. 5 is an enlarged view of inset 408 of FIG. 4. As illustrated, fixed length roller tray segment 502 is attached to floor beam 504 via serrated fitting 506 after final assembly. Fixed length roller tray segment 510 was pre-attached to floor beam 504 via fitting 512 prior to final assembly. Fitting 512 may be considered as an example of a standard fitting, not the subject of this disclosure.

First surface 520 of serrated fitting 506 is connected to fixed length roller tray segment 502 via fastener 522 engaged with overhang 524. Fastener 522 may be any type of fastener including, for example, a tension stud. Other structural arrangements are possible without overhang 524 and fastener 522 combination as long as first surface 520 includes a surface area whose minimal area is sufficiently sized to carry the anticipated loads coming from the cargo supported by the cargo handling system. Serrated fitting 506 includes serrated surface 526.

Serrated plate 528 is connected to floor beam 504. Serrated plate 528 is pre-attached to floor beam 504 prior to final assembly. Serrated plate 528 may be connected to floor beam 504 with fasteners 546, 548. Alternatively, in non-limiting examples, serrated plate 528 may be connected to floor beam 504 with adhesive or integrally formed with serrated plate 528. Serrated plate 528 includes pre-drilled hole 530. Pre-drilled hole 530 has dimension 532. The size and shape of pre-drilled hole 530 and dimension 532 generally match pre-drilled hole 540 and dimension 542 in floor beam 504.

Fastener 536 connects serrated fitting 506 to serrated plate 528. Fastener 536 has diameter 538. Diameter 538 is visibly less than dimension 532 and dimension 542 to allow placement of fastener 536 along the length of dimension 532 and dimension 542.

Serrations of serrated surface 526 engage serrations of serrated plate 528. The engagement of the serrations prevents forward-aft movement in direction 534 of serrated fitting 506 relative to serrated plate 528. The engagement of the serrations also helps prevent side-to-side movement of serrated fitting 506 relative to serrated plate 528. The placement of serrated fitting 506 relative to serrated plate 528 is adjustable because diameter 538 is less than dimension 532 and dimension 542. The adjustable placement of serrated fitting 506 relative to serrated plate 528 through the length of dimension 532 and dimension 542 accommodates manufacturing variances resulting from the spacing between floor beams 316, 318 of the two joined fuselage sections 302, 304 at final assembly which may vary at each fuselage integration zone.

Serrated fitting 506 may be referred to as a split fitting or roller tray end fitting. A split fitting works in conjunction with a standard fitting, such as fitting 512. Fitting 512 connects fixed length roller tray segment 510 to floor beam 504. Fixed length roller tray segment 510 does not span a fuselage integration zone. Serrated fitting 506 connects fixed length roller tray segment 502 to floor beam 504, where fixed length roller tray segment 502 spans a fuselage integration zone. Serrated fitting 506 accommodates accumulated tolerance between joined fuselage sections at the fuselage integration zone.

Load path 544 of fitting 512 is illustrated to pass through the fastener that connects fitting 512 to floor beam 504. The path of load path 544 passes through the fitting because the fastener is interference fit with the floor beam and, because of the lack of serrations, the fastener provides the only impediment to movement between the fitting and the floor beam.

In contrast, load path 550 of fixed length roller tray installation system 500 passes through serrated fitting 506 and bypasses fastener 536. The engagement of the serrations of serrated surface 526 and serrated plate 528 provide for load path 550.

Load path 550 represents the forward-aft and/or the side-to-side loads resulting from cargo movement supported by the cargo handling system. Vertical tension loads, such as when an aircraft goes into a steep decline, are not represented by the illustrated load path 550. Load path 550 begins in fixed length roller tray segment 502. Through the use of serrated fitting 506, load path 550 is directed from fixed length roller tray segment 502, through serrated fitting 506 and serrated plate 528 to floor beam 504. Load path 550 does not pass through fastener 536 used to attached serrated fitting 506, and ultimately fixed length roller tray segment 502, to floor beam 504.

Figure 8:
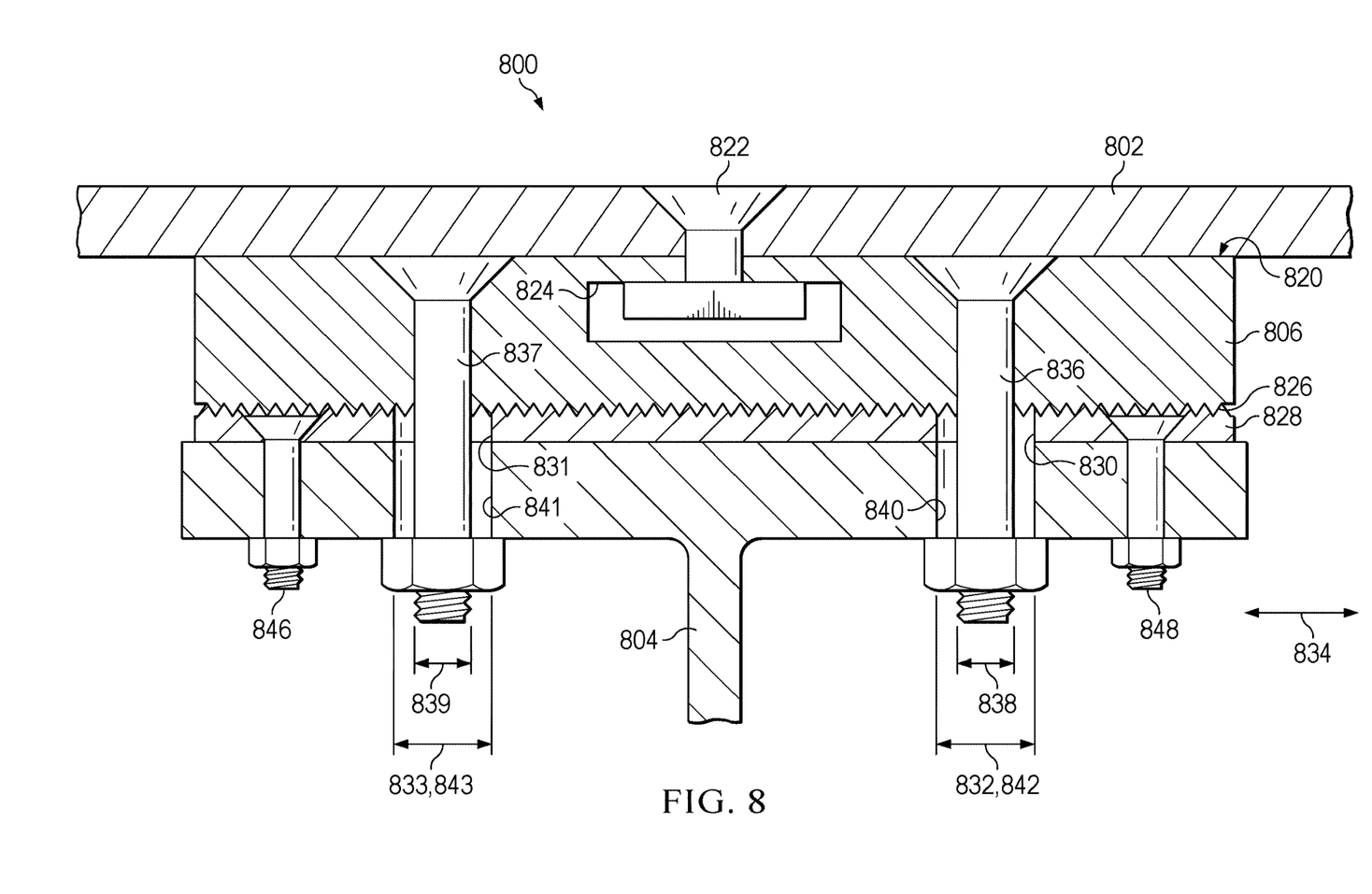
FIG. 8 is an illustration of a fixed length roller tray installation system in accordance with an illustrative embodiment.

With reference next to FIG. 8, an illustration of a fixed length roller tray installation system 800 is depicted in accordance with an illustrative embodiment.

As illustrated, fixed length roller tray segment 802 is attached to floor beam 804 via serrated fitting 806 after final assembly. Serrated fitting 806 may be referred to as a one-piece fitting or intermediate fitting. Fixed length roller tray segment 802 may or may not span a fuselage integration zone. Serrated fitting 806 replaces fitting 512 depicted in FIGS. 5-7 and doubles the surface area of serrated fitting 506. The particular elements of serrated fitting 806 perform in a similar manner to the elements of serrated fitting 506 previously described, however some elements may be duplicated.

First surface 820 of serrated fitting 806 is connected to fixed length roller tray segment 802 via fastener 822 engaged with overhang 824. Fastener 822 may be any type of fastener including, for example, a tension stud. Other structural arrangements are possible without overhang 824 and fastener 822 combination. Serrated fitting 806 includes serrated surface 826.

Serrated plate 828 is connected to floor beam 804. Serrated plate 828 is pre-attached to floor beam 804 prior to final assembly. Serrated plate 828 may be connected to floor beam 804 with fasteners 846, 848. Alternatively, in non-limiting examples, serrated plate 828 may be connected to floor beam 804 with adhesive or be integrally formed with floor beam 804. Serrated plate 828 includes pre-drilled holes 830, 831. Pre-drilled hole 830 has dimension 832 and pre-drilled hole 831 has dimension 833. The size and shape of pre-drilled holes 830, 831 and dimensions 832, 833 generally match pre-drilled hole 840 and dimension 842 and pre-drilled hole 841 and dimension 843, respectively in floor beam 804.

Fasteners 836, 837 connect serrated fitting 806 to serrated plate 828. Fastener 836 has diameter 838. Fastener 837 has diameter 839. Diameters 838, 839 are visibly less than dimensions 832, 842 and dimensions 833, 843 to allow placement of fasteners 836, 837 along the length of dimensions 532, 533, 542, 543.

Serrations of serrated surface 826 engage serrations of serrated plate 828. The engagement of the serrations prevents forward-aft movement in direction 834 of serrated fitting 806 relative to serrated plate 828. The engagement of the serrations also helps prevent side-to-side movement of serrated fitting 806 relative to serrated plate 828. The placement of serrated fitting 806 relative to serrated plate 828 is adjustable. The adjustable placement of serrated fitting 806 relative to serrated plate 828 through the length of dimensions 532, 533, 542, 543 accommodates manufacturing variances resulting from the spacing between floor beams of two joined fuselage sections at final assembly which may vary at each fuselage integration zone.

Figure 9:
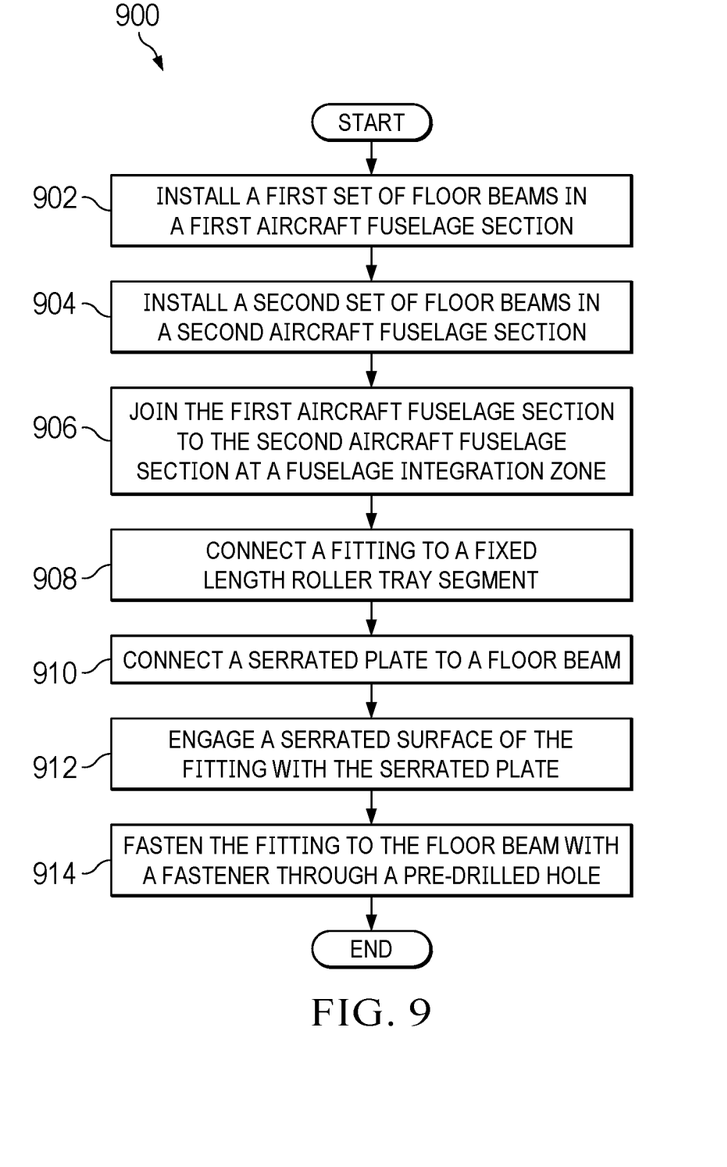
FIG. 9 is an illustration of a flowchart of a process for installing fixed length roller tray segments spanning an aircraft fuselage integration zone in accordance with an illustrative embodiment.

With reference next to FIG. 9, an illustration of a flowchart of a process 900 for installing fixed length roller tray segments spanning an aircraft fuselage integration zone is depicted in accordance with an illustrative embodiment. The method depicted in FIG. 9 may be used in conjunction with the fixed length roller tray installation system depicted in FIGS. 2-8.

The process begins by installing a first set of floor beams in a first aircraft fuselage section (operation 902). The process continues by installing a second set of floor beams in a second aircraft fuselage section (operation 904). At least one of the first set of floor beams or the second set of floor beams include a pre-drilled hole. At operation 906, the process joins the first aircraft fuselage section to the second aircraft fuselage section at a fuselage integration zone. At operation 908, the process connects a serrated fitting to a fixed length roller tray segment. At operation 910, the process connects a serrated plate to the set of floor beams that has the pre-drilled hole, either the first set of floor beams or the second set of floor beams. The serrated plate surrounds the pre-drilled hole. At operation 912, the process engages a serrated surface of the serrated fitting with the serrated plate. At operation 914, the process fastens the serrated fitting to the first set of floor beams or the second set of floor beams with a fastener through the pre-drilled hole. The pre-drilled hole has a dimension axially aligned with a longitudinal axis of the fixed length roller tray segment and the dimension is greater than a diameter of the fastener.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
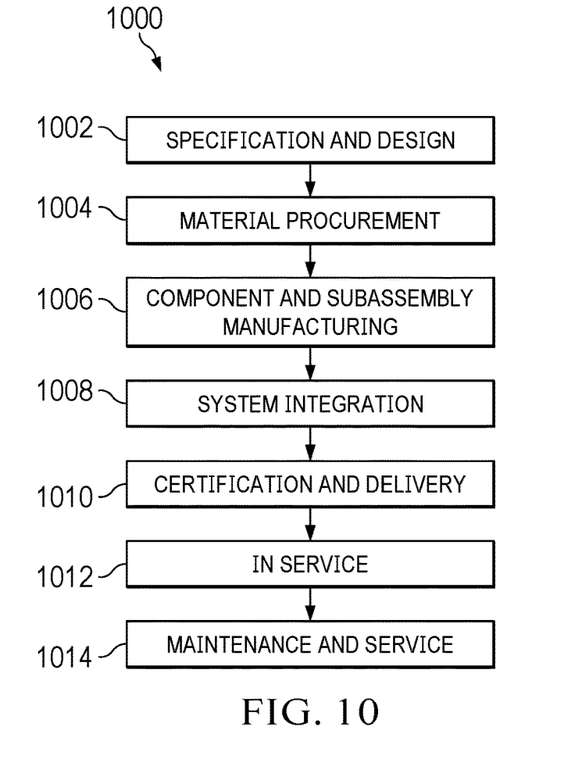
FIG. 10 is an illustration of a block diagram of an aircraft manufacturing and service method in accordance with an illustrative embodiment.
Figure 11:
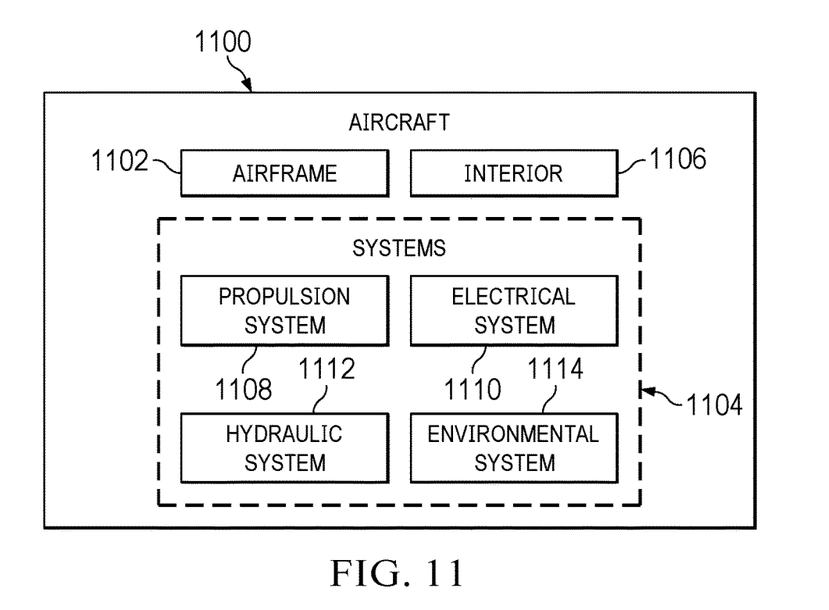
FIG. 11 is an illustration of a block diagram of an aircraft in which an illustrative embodiment may be implemented.

The illustrative embodiments of the disclosure may be further described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component, and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance, service, or inspection.

The apparatus of this disclosure may be installed on an aircraft during component and subassembly manufacturing 1006. In addition, the apparatus of this disclosure may be retrofitted onto aircraft 1100 in FIG. 11 during routine maintenance and service 1014 as part of a modification, reconfiguration, or refurbishment of aircraft 1100 in FIG. 11.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014, inclusive of inspection, in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A serrated fitting configured for installation of a fixed length roller tray segment of an aircraft, wherein the serrated fitting comprises:
    a first surface for connection to the fixed length roller tray segment, wherein the first surface includes an overhang sized for a fastener configured to connect the first surface to the fixed length roller tray segment; and
    a serrated surface opposite the first surface, the serrated surface configured for engagement with a serrated plate, the serrated plate attached to a floor beam preinstalled in the aircraft, wherein a second fastener connects the serrated surface to the serrated plate and the floor beam through a pre-drilled hole in the floor beam, the pre-drilled hole having a dimension axially aligned with a longitudinal axis of the fixed length roller tray segment and where the dimension is greater than a diameter of the second fastener.

2. The serrated fitting of claim 1, wherein a majority of a surface area of the serrated surface engages the serrated plate.

3. The serrated fitting of claim 1, wherein the fixed length roller tray segment spans a fuselage integration zone of the aircraft, and wherein the serrated fitting is a split serrated fitting comprising a first portion connected to the fixed length roller tray segment and a second portion connected to a second fixed length roller tray segment that does not span the fuselage integration zone of the aircraft.

4. The serrated fitting of claim 1, wherein the serrated fitting is positioned between the fixed length roller tray segment and the floor beam of the aircraft.

5. The serrated fitting of claim 1, wherein the serrated fitting is configured to direct a load path from the fixed length roller tray segment to the serrated plate and the floor beam.

6. The serrated fitting of claim 1, wherein a third fastener connects the serrated plate and the floor beam through a pre-drilled hole in the serrated plate.

7. The serrated fitting of claim 1, wherein a load path of the fixed length roller tray segment passes through the serrated fitting.

8. The serrated fitting of claim 7, wherein the load path of the fixed length roller tray segment bypasses the second fastener.

9. A fixed length roller tray installation system that comprises:
    a fixed length roller tray segment of an aircraft connected to a serrated fitting that comprises a first surface and a serrated surface, wherein the first surface includes an overhang sized for a fastener configured to connect the first surface to the fixed length roller tray segment; and
    a serrated plate connected to a floor beam of the aircraft, wherein the serrated surface of the serrated fitting engaged with the serrated plate, wherein the serrated fitting is connected to the serrated plate and the floor beam of the aircraft with a second fastener through a pre-drilled hole in the floor beam.

10. The system of claim 9, wherein the fixed length roller tray segment spans a fuselage integration zone of the aircraft, and wherein the serrated fitting is a split serrated fitting comprising a first portion connected to the fixed length roller tray segment and a second portion connected to a second fixed length roller tray segment.

11. The system of claim 9, wherein the pre-drilled hole comprises a dimension axially aligned with a longitudinal axis of the fixed length roller tray segment and where the dimension provides a clearance fit with the second fastener.

12. The system of claim 9, wherein a majority of a surface area of the serrated surface engages the serrated plate.

13. The system of claim 9, wherein the serrated fitting is positioned between the fixed length roller tray segment of the aircraft and the floor beam of the aircraft.

14. The system of claim 9, wherein the serrated fitting is positioned between the fixed length roller tray segment of the aircraft and the serrated plate.

15. The system of claim 9, wherein a load path of the fixed length roller tray segment of the aircraft bypasses the second fastener.

16. The system of claim 15, wherein the load path of the fixed length roller tray segment of the aircraft is also carried through the serrated fitting.

17. A method for installing fixed length roller tray segments spanning an aircraft fuselage integration zone, the method comprising:
   installing a first set of floor beams in a first aircraft fuselage section;
   installing a second set of floor beams in a second aircraft fuselage section, wherein at least one of the first set of floor beams or the second set of floor beams comprises a pre-drilled hole;
   joining the first aircraft fuselage section to the second aircraft fuselage section at a fuselage integration zone;
   connecting a serrated fitting to a fixed length roller tray segment of the fixed length roller tray segments, the serrated fitting comprising a first surface including an overhang sized for securing a fastener connecting the first surface to the fixed length roller tray segment;
   connecting a serrated plate to the first set of floor beams or the second set of floor beams having the pre-drilled hole, the serrated plate surrounding the pre-drilled hole;
   engaging a serrated surface of the serrated fitting with the serrated plate; and
   fastening the serrated fitting to the first set of floor beams or the second set of floor beams with a second fastener through the pre-drilled hole, wherein the pre-drilled hole has a dimension axially aligned with a longitudinal axis of the fixed length roller tray segment and wherein the dimension is greater than a diameter of the second fastener.

18. The method of claim 17, wherein the serrated fitting is positioned between the fixed length roller tray segment and the serrated plate.

19. The method of claim 17, wherein a load path of the fixed length roller tray segment bypasses the second fastener.

20. The method of claim 19, wherein the load path of the fixed length roller tray segment passes through the serrated fitting.

* * * * *